United States Patent
Yablochnikov et al.

(10) Patent No.: US 9,028,164 B2
(45) Date of Patent: May 12, 2015

(54) MAGNETIC PULSE FORMED VEHICLE DRIVESHAFT AND METHOD OF MAKING SAME

(75) Inventors: Boris A Yablochnikov, Toledo, OH (US); Johnny N Smith, Toledo, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 45 days.

(21) Appl. No.: 13/415,386

(22) Filed: Mar. 8, 2012

(65) Prior Publication Data
US 2013/0236244 A1  Sep. 12, 2013

(51) Int. Cl.
*F16D 1/12* (2006.01)
*F16C 3/03* (2006.01)
*F16D 3/06* (2006.01)
*B23K 20/06* (2006.01)
*F16D 1/068* (2006.01)
*F16D 1/08* (2006.01)

(52) U.S. Cl.
CPC ............. *F16D 3/06* (2013.01); *Y10T 403/7026* (2015.01); *Y10T 29/49803* (2015.01); *B23K 20/06* (2013.01); *F16D 2300/12* (2013.01); *F16D 1/068* (2013.01); *F16D 1/0858* (2013.01); *F16D 2250/0061* (2013.01); *F16D 2250/0076* (2013.01)

(58) Field of Classification Search
USPC .......... 403/359.1, 359.5, 359.6; 411/162, 182
See application file for complete search history.

(56) References Cited

U.S. PATENT DOCUMENTS

| | | | |
|---|---|---|---|
| 2,198,654 A * | 4/1940 | Calkins et al. | ................. 464/162 |
| 2,341,084 A | 2/1944 | Dodge | |
| 2,478,890 A | 8/1949 | Barager | |
| 3,092,165 A | 6/1963 | Harvey | |
| 3,126,937 A | 3/1964 | Brower | |
| 3,214,511 A | 10/1965 | Franklin | |
| 3,417,456 A | 12/1968 | Carlson | |
| 3,520,049 A | 7/1970 | Lysenko | |
| 3,528,596 A | 9/1970 | Carlson | |
| 3,642,311 A | 2/1972 | Edgemond | |
| 3,777,783 A | 12/1973 | Beck | |
| 3,961,739 A | 6/1976 | Leftheris | |
| 3,992,120 A | 11/1976 | Recker | |

(Continued)

FOREIGN PATENT DOCUMENTS

DE  2728306  1/1978
DE  2008049825 A1  4/2010

(Continued)

*Primary Examiner* — Michael P Ferguson
(74) *Attorney, Agent, or Firm* — Marshall & Melhorn, LLC

(57) ABSTRACT

A method of forming a sliding spline-type joint using magnetic pulse forming technology includes providing a female driveshaft member and a splined insert having inwardly formed splines. A male driveshaft member is provided having outwardly formed splines engageable with the insert. A mandrel is provided having outer ribs similar to the outer spline profile of the male driveshaft member. An inductor is provided which is energized to create a pulse magnetic field. The insert is placed over the mandrel. The female driveshaft member is disposed over the insert, and both are placed inside the inductor. The inductor is energized to deform a portion of the female driveshaft member over the insert to form an array of crimps for permanently connecting the female driveshaft member with the insert. The male driveshaft member is engaged into the insert to provide a sliding spline-type of slip joint.

4 Claims, 4 Drawing Sheets

(56) References Cited

U.S. PATENT DOCUMENTS

| | | | |
|---|---|---|---|
| 4,033,020 A | 7/1977 | Hudgens | |
| 4,067,216 A | 1/1978 | Khimenko | |
| 4,125,000 A * | 11/1978 | Grob | 464/162 |
| 4,129,846 A | 12/1978 | Yablochnikov | |
| 4,211,589 A | 7/1980 | Fisher | |
| 4,469,356 A | 9/1984 | Duret | |
| 4,504,714 A | 3/1985 | Katzenstein | |
| 4,513,188 A | 4/1985 | Katzenstein | |
| 4,523,872 A | 6/1985 | Arena | |
| 4,551,118 A | 11/1985 | Spisz | |
| 4,572,022 A * | 2/1986 | Mettler | 74/492 |
| 4,702,543 A | 10/1987 | Hager | |
| 4,789,094 A | 12/1988 | Chudakov | |
| 4,807,351 A | 2/1989 | Berg | |
| 4,930,204 A | 6/1990 | Schurter | |
| 4,990,732 A | 2/1991 | Dudko | |
| 5,222,915 A | 6/1993 | Petrzelka | |
| 5,318,374 A | 6/1994 | Rumberger | |
| 5,464,251 A * | 11/1995 | Daumal Castellon | 280/777 |
| 5,634,853 A | 6/1997 | Smith | |
| 5,716,276 A | 2/1998 | Mangas | |
| 5,813,264 A | 9/1998 | Steingroever | |
| 5,824,998 A | 10/1998 | Livshiz | |
| 5,979,694 A | 11/1999 | Bennett | |
| 5,981,921 A | 11/1999 | Yablochnikov | |
| 6,255,631 B1 | 7/2001 | Kichline | |
| 6,348,670 B2 | 2/2002 | Kistersky | |
| 6,367,680 B1 | 4/2002 | Duggan | |
| 6,368,225 B1 | 4/2002 | Breese | |
| 6,379,254 B1 | 4/2002 | Yablochnikov | |
| 6,400,538 B1 | 6/2002 | Kistersky | |
| 6,412,818 B1 | 7/2002 | Marando | |
| 6,438,839 B1 | 8/2002 | Hardesty | |
| 6,449,550 B1 | 9/2002 | Lutz | |
| 6,452,139 B1 | 9/2002 | Benoit | |
| 6,484,384 B1 | 11/2002 | Gibson | |
| 6,523,876 B1 | 2/2003 | Durand | |
| 6,531,688 B2 | 3/2003 | Yablochnikov | |
| 6,548,791 B2 | 4/2003 | Kistersky | |
| 6,548,792 B1 | 4/2003 | Durand | |
| 6,558,262 B1 * | 5/2003 | Breidenbach et al. | 464/175 |
| 6,630,649 B1 | 10/2003 | Gafri | |
| 6,643,928 B2 | 11/2003 | Hardesty | |
| 6,754,943 B1 | 6/2004 | Perry | |
| 6,761,503 B2 | 7/2004 | Breese | |
| 7,007,362 B2 | 3/2006 | Gibson | |
| 7,015,435 B2 | 3/2006 | Yablochnikov | |
| 7,025,686 B1 | 4/2006 | Aiken | |
| 7,080,437 B2 | 7/2006 | da Silva | |
| 7,127,816 B2 | 10/2006 | Kiehl | |
| 7,256,373 B2 | 8/2007 | Gafri | |
| 7,363,945 B2 | 4/2008 | Saha | |
| 7,364,062 B2 | 4/2008 | Moore | |
| 7,591,164 B2 | 9/2009 | Duggan | |
| RE41,101 E | 2/2010 | Yablochnikov | |
| 2002/0003159 A1 | 1/2002 | Gabbianelli | |
| 2003/0048164 A1 | 3/2003 | Sentoku | |
| 2003/0192879 A1 | 10/2003 | Yablochnikov | |
| 2003/0218051 A1 | 11/2003 | Yablochnikov | |
| 2006/0156776 A1 | 7/2006 | Yablochnikov | |
| 2006/0217210 A1* | 9/2006 | Gibson | 464/183 |
| 2008/0120844 A1 | 5/2008 | Yang | |
| 2009/0124399 A1 | 5/2009 | Jung et al. | |
| 2009/0181779 A1 | 7/2009 | Wagner | |
| 2012/0165106 A1* | 6/2012 | Eltner | 464/162 |

FOREIGN PATENT DOCUMENTS

| | | |
|---|---|---|
| EP | 1634659 | 3/2006 |
| EP | 1683979 | 7/2006 |
| EP | 1698787 A2 | 9/2006 |
| FR | 1200466 | 12/1959 |
| FR | 2450145 | 9/1980 |
| FR | 2749258 A1 | 12/1997 |
| JP | 02004034154 | 2/2004 |
| JP | 02004034155 | 2/2004 |
| JP | 02004130384 | 4/2004 |

* cited by examiner

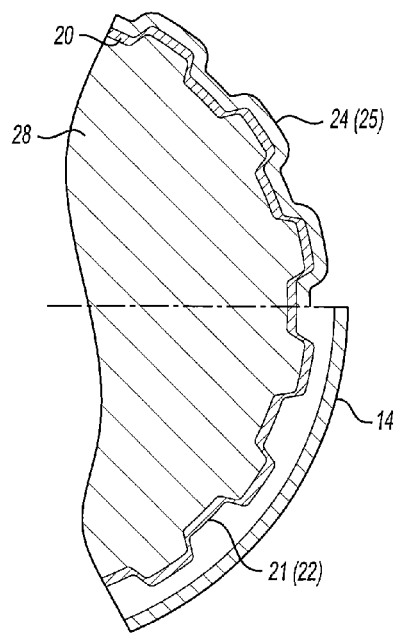
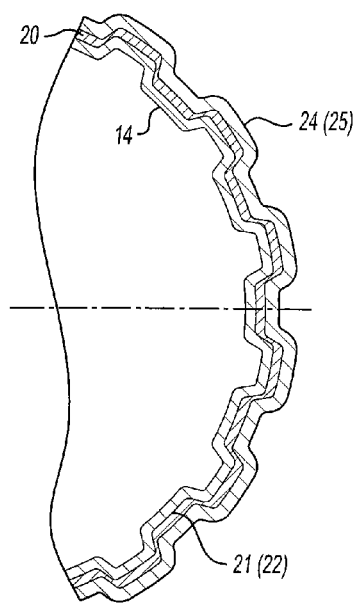
Fig-4  Fig-5
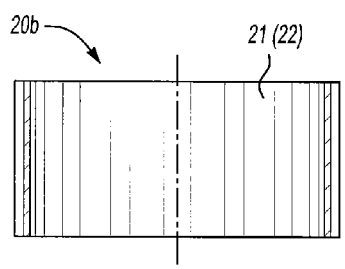
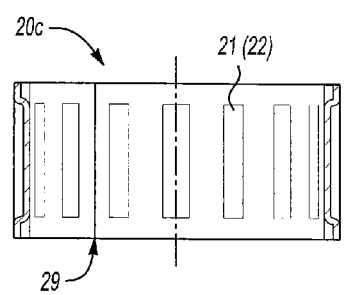
Fig-6  Fig-7

MAGNETIC PULSE FORMED VEHICLE DRIVESHAFT AND METHOD OF MAKING SAME

RELATED APPLICATIONS

Not Applicable

FIELD OF THE INVENTION

This invention relates to vehicular driveshaft assemblies and in particular to a method of forming a sliding spline-type joint using magnetic pulse forming technology.

BACKGROUND OF THE INVENTION

The present invention relates to a driveshaft design and method of making same, capable of utilizing the advantages of magnetic pulse forming technology to simplify a driveshaft sliding spline-type joint and to eliminate electric erosion of the active working mandrel surface.

Torque transmitting shafts (driveshafts) are widely used for transferring rotational power from a source of rotational power to a rotatably driven mechanism. For example, in most land vehicles in use today, a drive train system is provided for transmitting rotational power from an output shaft of an engine/transmission assembly to an output shaft of an axle assembly so as to rotatably drive the wheels of the vehicle. To accomplish this, a typical vehicular drive train system includes a hollow cylindrical driveshaft tube. A first universal joint is connected between the output shaft of the engine/transmission assembly and the first end of the driveshaft tube, while a second universal joint is connected between the second end of the driveshaft tube and the input shaft of the axle assembly. The universal joints provide a rotational driving connection from the output shaft of the engine/transmission assembly through the driveshaft tube to the input shaft of the axle assembly while accommodating a limited amount of misalignment between the rotational axes of the shafts.

Where the driveshaft tube has two or more sections, connection of the first driveshaft section and the second driveshaft section is typically accomplished by using a sliding spline-type slip joint having cooperating male and female members with respective pluralities of splines formed thereon. The male member is generally cylindrical in shape and has a plurality of outwardly extending splines formed on the outer surface thereof. The female member is generally hollow and cylindrical in shape and has a plurality of inwardly extending splines formed on the inner surface thereof. The male member is inserted within the female member such that the outwardly extending splines of the male member cooperate with the inwardly extending splines of the female member. As a result, the male and female members are connected together for concurrent rotation movement and for relative axial movement.

Theoretically, if the male and female members of the driveshaft are made from aluminum tubes, the splines may be formed using magnetic pulse forming techniques. Magnetic pulse forming was developed as a means of shaping and assembling metal parts. The technology is especially convenient for treatment of tubular parts using cylindrical inductors, but also is capable of forming sheet metal with the help of flat inductors. If necessary, both forming and assembly can be executed in a single step. The materials that are the most easily formed by pulse magnetic field are ones that have a high electrical conductivity such as copper, brass and aluminum. Material with low conductivity can be formed if very high frequency pulses or driving rings made from aluminum or copper are used.

In comparison with other metal forming methods, magnetic pulse forming has several advantages: the process is easy to control, the forming tool (inductor) is not mechanically connected with the to-be-formed work piece (following no tooling indentations); the same inductor can be used to form parts of different shapes; forming can be made through insulated walls and vacuum; only one piece of tooling (mandrel or die) needs to be used; there is a very high specific pressure of forming; very high velocity of forming increases the metal plasticity, and there is high productivity. The basic disadvantages of magnetic pulse forming are: it is hard to perform deep elongation; it is practically impossible to form most types of steel without a driver and impossible to form parts when the free passage of electric current is restricted.

Magnetic pulse forming technology uses a high voltage capacitor bank, a high current switch, a forming inductor, a high voltage power supply, and an electrically conductive work piece. The magnetic field is created by the discharge of the bank capacitor into the forming inductor. The work piece is typically placed very close to the inductor coil so that an eddy current is inducted into the work piece. From the moment the magnetic field is created, an eddy current is induced electromagnetically into the work piece in the opposite direction of the current of the coil. The interaction of the opposite flowing currents in the inductor coil and the work piece causes a mutual repulsion. The mutual repulsion causes a pressure impulse on the surfaces of the inductor coil and work piece. The inductor has to be mechanically very strong to withstand this pressure without deformation. So, the pulse of electromagnetic pressure causes high-velocity deformation of only the part of the work piece located under the inductor coil. That piece rapidly moves away from the coil until all the beginning kinetic energy is spent for deformation, or until the to-be-formed part collides with the shaping surfaces, for example the mandrel. The pulses of the magnet field are typically kept short to avoid reduction of magnetic pressure as a result of the magnetic field penetrating through the wall of the work piece. If the inductor is disposed about the exterior of the work piece, then the work piece can be deformed inwardly into engagement with the support surface of the mandrel to form the female splines. If, on the other hand, the inductor is disposed within the interior of the work piece, then the work piece can be deformed outwardly into engagement with the support surface to form the male splines.

However, it is hard to realize the described technique in practice, especially under the high volume production conditions typical for manufacturing driveshafts. Indeed, from the point of view of efficiency, reliability and safety, to form the splines of aluminum tubes, the most appropriate magnetic pulse forming machine is one with voltage of capacitor battery below 10 kV and frequency of the magnetic pulse about 10 kHz. But because the wall thickness of the typical aluminum driveshaft tube it 2.0-2.5 mm, it is inevitable that the magnetic field of this frequency will partly penetrate through the tube wall in the space between the internal tube surface and the supporting surfaces of the mandrel. In the process of high velocity tube deformation, the penetrated magnetic flux (the product of the average magnetic field times the perpendicular area that it penetrates) will be captured and compressed quickly in the gap. As a result, very high opposing currents will be induced along the perimeter of those surfaces and at the moment the tube collides about the mandrel, electric erosion of the contact surfaces occurs. The erosion is especially intense in the bottom of the mandrel grooves, where the tops of the splines are in contact first. This electric erosion destroys the active mandrel surface very fast. Electric erosion of these surfaces is the main restriction to wide proliferation of magnetic pulse forming technology in applications where mandrels/dies have to be used. Theoretically the mandrel surface could be protected from erosion by using dielectric coating or spacers, for example. Also a higher frequency and resultant higher voltage magnetic pulse machine could reduce the intensity of erosion. But it is technically difficult and expensive to realize those opportunities to cure the problem in practice.

SUMMARY OF THE INVENTION

The present invention is directed toward a method of forming a sliding spline-type joint using magnetic pulse forming technology. According to this invention there is provided a method of forming a sliding spline-type joint, the method including providing a female tubular driveshaft member and a tubular splined insert having at least one array of inwardly formed splines. A male driveshaft member is provided having outwardly formed splines engageable with the splined insert, and a mandrel having outer ribs with a profile essentially the same as an outer spline profile of the male driveshaft member. An inductor is also provided which is capable of being energized to create a pulse magnetic field. The tubular splined insert is placed over the mandrel. The female tubular driveshaft member is disposed over the splined insert, and then both are placed coaxially inside the inductor. The inductor is energized to deform at least a portion of the female tubular driveshaft member over the insert to form at least one annular array of crimps for permanently connecting the female tubular driveshaft member with the insert. The female driveshaft member with the insert is removed from the inductor, and the male driveshaft member is engaged with and into the splined insert connected with the tubular female driveshaft member to provide a sliding spline type of slip joint.

In accordance with the present invention, it is highly desirable to develop a driveshaft design and manufacturing process capable of utilizing the advantages of magnetic pulse forming technology to simplify a driveshaft sliding spline-type slip joint and to eliminate electric erosion of the working mandrel surface.

BRIEF DESCRIPTION OF THE DRAWINGS

The above, as well as other advantages of the present invention, will become readily apparent to those skilled in the art from the following detailed description when considered in the light of the accompanying drawings in which:

FIG. 4 is part of a cross sectional view of a mandrel, insert and female tube assembly prior and subsequent to application of the magnetic pulse;

FIG. 5 is part of a cross sectional view of the driveshaft shown in FIG. 1;

FIG. 6 is an axial sectional view of another embodiment of the insert 20b, shown in FIG. 8;

FIG. 7 is an axial sectional view of another embodiment of the insert 20c, shown in FIG. 8;

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
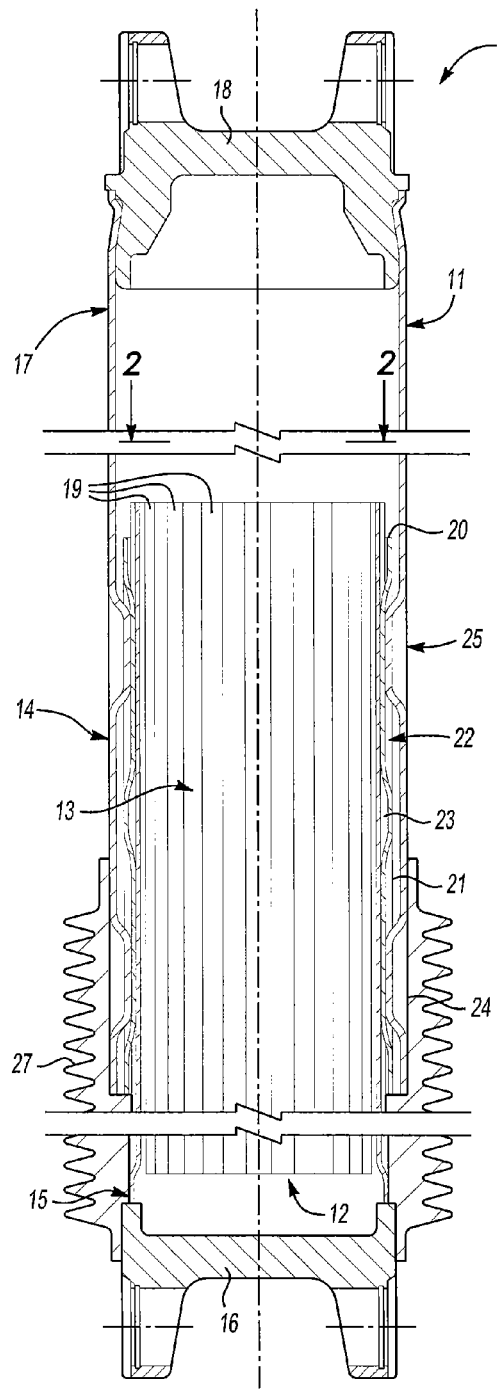
FIG. 1 is an axial section view of a vehicle driveshaft in accordance with the present invention.

Referring now to the drawings and particular to FIG. 1, there is shown generally at 10 a driveshaft assembly having a sliding spline-type of slip joint. The driveshaft assembly 10 includes a female driveshaft tube 11 and a male driveshaft tube 12. A first end portion 13 of the male driveshaft tube 12 is received in a first end portion 14 of the female driveshaft tube 11 in a telescoping manner. A second end portion 15 of the male driveshaft tube 12 is connected to a first yoke 16. A second end portion 17 of the female driveshaft tube 11 is connected to a second yoke 18, such as by a magnetic pulse welding process. The first end portion 13 of the male driveshaft tube 12 has an annular array of radially outward extending splines or engaged segments 19. The engaged segments 19 extend continuously from the first end portion 13 to the second end portion 15, of the male driveshaft tube 12.

Between the first end 13 portion of the male driveshaft tube 12 and the first end portion 14 of the female driveshaft tube 11 an insert 20 is located which has a first and a second annular array of preliminarily formed axial splines 21, 22. A cross section of the insert 20 illustrating the two annular arrays of splines 21, 22 is shown in FIG. 2, and an axial section of the insert 20 again illustrating the splines 21, 22 is shown in FIG. 3.

Figure 2:
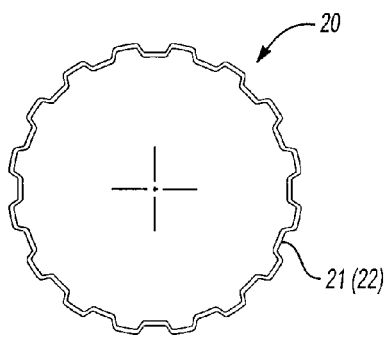
FIG. 2 is a cross section view of the insert shown in FIG. 1 along line 2-2.
Figure 3:
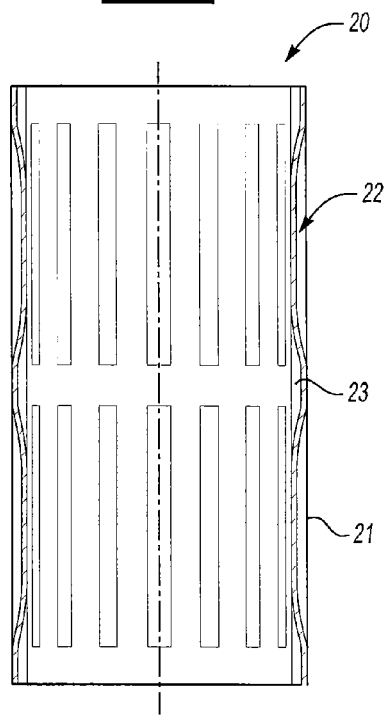
FIG. 3 is an axial section view of the insert shown in FIG. 1.

As depicted in FIG. 2, the splines 21, 22 are aligned with one another, and there are an equal number of splines 21, 22 within each set. Within each set, the splines 21, 22 are equal in width, length and depth. The splines 21, 22 are spaced axially from each other and an annular pocket 23 is formed between the splines 21, 22, as depicted in FIG. 3. The pocket 23 maintains a substantially equal length, depth and width around the insert 20, and it is also at the same axial distance around the insert 20. The splines 21, 22 may be flared to form a half bead at each end of the insert 20.

Referring now to FIG. 4, there is illustrated a portion of a cross section in the area of crimping an assembly that includes a mandrel 28, insert 20 and the first end portion 14 of the female driveshaft tube 11 before (bottom view) and after a magnetic pulse crimping operation (upper view). The surface of the mandrel 28 should be lubricated before putting the insert 20 over it to facilitate extracting the mandrel 28 from the insert 20 after magnetic pulse crimping.

The insert 20 can be made from any suitable material or combination of materials and can have any suitable length. The splines 21, 22 in the insert 20 also can have any suitable length. Typically, the insert 20 should be formed from a metallic material or a metallic material alloy. Different technology of producing the splines 21, 22 in the insert 20 can be used that depend on the material and length of the insert 20 needed. For example, Grob process technology is very effective if the insert 20 is to be relatively long and is made from steel or other metal tubes.

However, metal powder or extrusion technologies could be more effective if the insert 20 is to be short. It isn't mandatory for the insert 20 to be circularly closed in order to be strong against the radial force that affects it in the process of driveshaft operation in the vehicle. Actually, after magnetic pulse crimping, the first end 14 of the female driveshaft tube 11 will work against this radial force in the area of the slip joint. Because of that, the insert 20 could have a cut 29 as shown in FIG. 7. Consequently, it could be easily produced from a metal band or metal sheet using cutting, stamping and banding operations separately or jointly to cut a work piece, for the splines 21, 22 and bend the insert 20 into a final circular shape.

If it's necessary to more precisely retain the circular shape of the insert 20 after bending it into a circle, the edges of the cut 29 could be welded entirely or just tack welded to reinforce the desired circular shape. It is understood that different embodiments, material and technology can be used for producing the insert 20 without changing the scope of the given invention. The choice of technology is facilitated by the fact that the dimensional demands on the insert 20 are pretty low because the final shape of the splined areas 21, 22 of the insert 20 are defined by the shape of the mandrel 28 as a result of magnetic pulse crimping operations, which renders them very precise.

Figure 8:
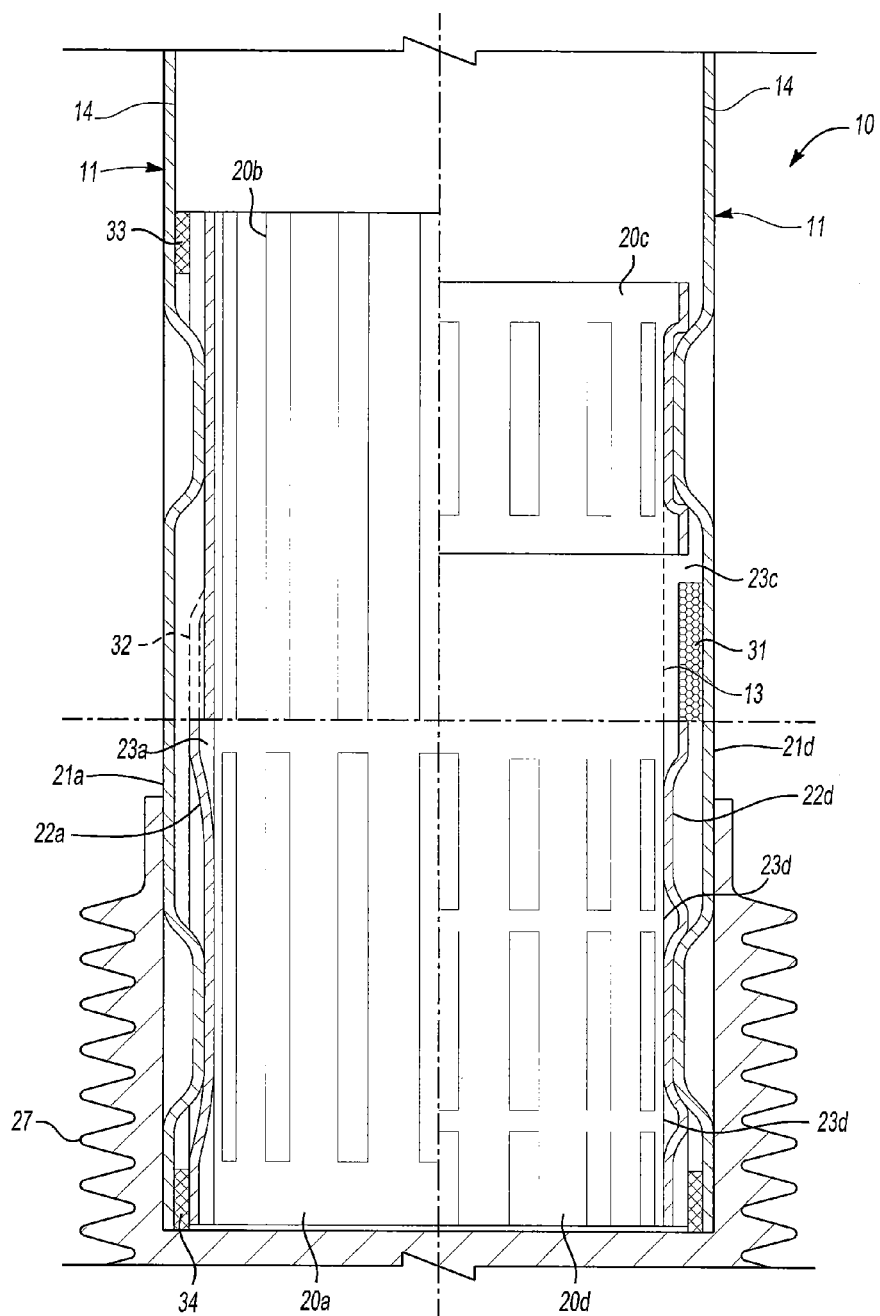
FIG. 8 illustrates different embodiments of the sliding spline-type slip joint shown in FIG. 1.

Referring now to FIG. 8, there is illustrated several versions of an axial section of a sliding spline-type of slip joint with different embodiments of the insert 20. The alternative embodiments are shown as 20a, 20b, 20c and 20d. The alternative embodiments provide different capabilities for retaining and distributing grease. It is well known that adequate lubrication is critically important to the proper operation of the sliding spline type of slip joint. Typically, grease is used as the lubricant. However, it is understood that other lubricants could be used such as oil or a dry lubricant, for example. The lubricant supplied facilitates proper operation of the driveshaft assembly 10, and protects against corrosion and wear.

FIG. 8, embodiment 20a is an example of the Grob process for producing relatively long splines 21a, 22a. However, in practice this technology can provide only one pocket 23a to retain the grease, which potentially can cause axially non-uniform grease distribution along sliding surfaces if the distance of driveshaft slipping is small.

More uniform axial grease distribution is provided by the shape of the insert 20d, which may have two grease pockets 23d, as is shown in the right bottom section of FIG. 8. In this embodiment the splines 21d, 22d are short. The Grob process isn't appropriate for this type of insert (it has inherent limitations by minimal length of the spline that can be formed). The insert 20d is best produced by using sheet metal.

The same technology looks used to produce 20d is also best for the embodiment of insert 20c, shown in the upper right section of FIG. 8. In this case because the insert 20c is short, when the driveshaft assembly 10 is assembled a very big pocket 23c is automatically created in the space between the first end portion 14 of the female driveshaft tube 11 and the first end portion 13 of the male driveshaft tube 12 (shown by the dotted line). The pocket 23c is available for the grease, but a large mass of grease, if it's circularly non-uniformly distributed, can misbalance the driveshaft. This is unacceptable because it may cause vehicle vibrations during operation and rotation of the driveshaft assembly. To avoid misbalance, a sleeve 31 made from a grease penetrated material, felt for example, could be inserted in the process of assembling the driveshaft assembly 10.

The extrusion method or powder metal technologies are best to produce the embodiment of insert 20b shown in the upper left section of FIG. 8. Made from powder metal, insert 20b is self lubricated because of an inherent property of the powdered materials. In this embodiment to retain the grease, if insert 20b is made by the extrusion method, a bulge 32 can be made by any suitable method inside the extruded insert 20b after extrusion. Rings 33, 34 made from plastic or metal, may be used if necessary to precisely coaxially position the insert 20b relative to the first end portion 14 of the female driveshaft tube 11 during the magnetic pulse crimping operation.

Figure 9:
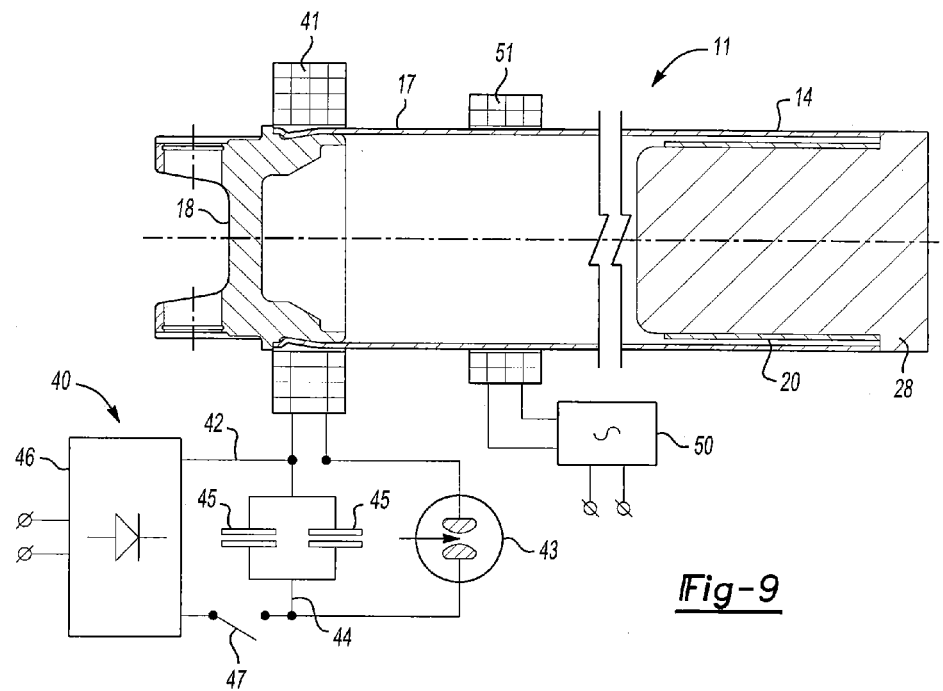
FIG. 9 is an illustration of a device and process.

Referring now to FIG. 9, there is illustrated a portion of a control circuit indicated generally at 40, for performing a magnetic pulse forming process or magnetic pulse welding process. For simplicity of the drawing, the position of the parts of the driveshaft assembly 10 are shown for the moment when the second end portion 17 of the female driveshaft tube 11 has already been welded with the second yoke 18 by a magnetic pulse welding method.

The first end portion 14 of the female driveshaft tube 11 has a first and second annular array of the magnetic pulse formed crimps 24, 25, (as shown in FIG. 5) which are axially spaced from each other and provide a reliable connection between an internal surface of the first end portion 14 of the female driveshaft tube 11 with an outer surface of the insert 20. The outer surface of the engaged segments 19 of the first end portion 13 of the male driveshaft tube 12 are slidably connected with an internal surface of the splines 21, 22 formed in the insert 20. It is understood that additional annular arrays of the splines may be formed on the first end portion 14 of the female driveshaft tube 11 and insert 20 as desired. In the last case more pockets 23 will be automatically formed in the insert 20, as is most clearly illustrated in the different embodiments depicted on FIG. 8. After assembling the driveshaft assembly 10, grease will accumulate and be retained in the pockets 23 of the sliding spline-type of slip joint. This grease will distribute along the contact surfaces of the engaged segments 19 of the first end portion 13 of the male driveshaft tube 12, and the splines 21, 22 of the insert 20 in the process of sliding, which is highly favorable for the functionality of the life of the slip joint. A rubber or plastic boot 27 may be used to protect all the parts of the sliding spline-type of slip joint from contamination, as shown in FIG. 8.

The control circuit 40 is, of itself, conventional in the art, and the illustrated control circuit 40 is intended to be representative of any structure for performing a magnetic pulse forming process or magnetic pulse welding process. Thus, the scope of this invention is not intended to be limited for use with the control circuit 40 illustrated in FIG. 9.

The illustrated control circuit 40 includes an inductor coil 41 that is adapted to be disposed about the to-be-welded second end portion 17 of the female driveshaft tube 11. The inductor coil 41 can be formed having any desired structure, such as that shown and described in U.S. Pat. No. 4,129,846 to Yablochnikov, which is incorporated by reference herein.

The inductor coil 41 is connected to the schematically illustrated control circuit 40 for selectively operating the same. To accomplish this, one end of the inductor coil 41 is connected to a first electrical conductor 42, while the other end of the inductor coil 41 is connected through a discharge switch 43 to a second electrical conductor 44. A plurality of high voltage capacitors 45, or other energy storage devices, are connected between the first and second electrical conductors 42, 44. The first electrical conductor 42 is also connected to a source of electrical power 46, while the second electrical conductor 44 is connected through a charging switch 47 to the source of the electrical power 46. The structure and operation of the control circuit is described in detail in U.S. Pat. No. 5,981,921 to Yablochnikov, which is incorporated by reference herein.

The operation of the inductor coil 41 to perform the magnetic pulse welding process or a magnetic pulse forming process is well known in the art, and reference is again made to the above-referenced patents for a detailed explanation. Briefly, however, the inductor coil 41 is operated by initially opening the discharge switch 43 and closing the charging switch 47, as shown in FIG. 9. This allows electrical energy to be transformed from the source of electrical power 46 to each of the capacitors 45. When the capacitors 45 have been charged to a predetermined voltage, the charging switch 47 is opened, as shown in FIG. 9. Thereafter, when it is desired to energize the inductor coil 41, the discharge switch 43 is closed. As a result, a high energy pulse of electrical current flows from the capacitors 45 through the inductor coil 41, thereby generating an immense and momentary electromagnetic field about or within a work piece.

In the illustrated embodiment, the inductor coil 41 is sized and shaped to be disposed concentrically about the female driveshaft tube 11. Thus, when the inductor coil 41 is energized and the electromagnetic field is generated, a very large force is exerted on the outer surface of the female driveshaft tube 11, causing it to collapse inwardly away from the inductor coil 41. Depending upon the magnitude of the electromagnetic field that is generated and other factors, the inductor coil 41 may be used either to perform a magnetic pulse forming process, wherein the female driveshaft tube 11 is deformed to a desired shape, or a magnetic pulse welding process, wherein two metallic work pieces are permanently secured together, as described in detail above.

It's well known that increasing the plasticity of a to-be-welded or to-be-formed tube significantly reduces wear out of all the elements of the control circuit 40 because to provide a good quality joint by magnetic pulse welding or crimping, less energy of the magnetic pulse needs to be used. Today, the most popular method of reducing the necessary energy of the magnetic pulse is based on reducing the material yield strength by means of the technique known as retrogressive heat treatment (RHT).

This method could be used in this invention for magnetic pulse welding the second end portion 17 of the female driveshaft tube 11 and for magnetic pulse forming of the first and second annular array of magnetic pulse formed crimps 24, 25 on the first end portion 14 of the female driveshaft tube 11. A typical RHT, yield strength of 6061T6 aluminum alloy dropped from 40 ksi to about 10 ksi, which permits significant reduction of the necessary energy of magnetic pulse for welding or forming (U.S. Pat. No. 4,766,664 to Alcoa, which is incorporated by reference herein.)

A basic disadvantage of the RHT technique in its magnetic pulse welding application is the existence of the cooling step, in the process of which the heating energy—about 20 times greater than that of the magnetic pulse—is not only wasted but unavailable as a theoretically beneficial asset of the welding process. Indeed, to weld metal pieces, the surface atoms are activated by accepting any kind of energy. Heating is the most convenient and effective way to provide the atoms with the necessary energy for activation. So, theoretically, just preheating the tube ends should be better for magnetic pulse welding the driveshaft than using the RHT technique. Naturally, if preheating is used to facilitate the magnetic pulse welding it makes sense to use preheating to facilitate the magnetic pulse forming operation as is chosen in the present invention.

Most of the truly important innovation related to induction preheating in magnetic pulse technology was suggested more than 40 years ago in U.S. Pat. No. 3,126,937 to Brower and Fortescue, which is incorporated by reference herein. There are scores of patents related to induction preheating in the different magnetic pulse processes and this method of preheating is used in the present invention. For this a high frequency power supply 50 and preheating inductor 51 are used, as shown in FIG. 9.

The process of magnetic pulse welding, starts with inserting the second end portion 17 of the female driveshaft tube 11 inside the preheating inductor 51 and inserting the neck of the second yoke 18 into the inductor coil 41. Inside the first end portion 14 of the female driveshaft tube 11 is located the insert 20, which is put onto the mandrel 28. It is understood that automatic tooling (not shown) is used for axially moving the driveshaft's parts in the process of magnetic pulse connection. The preheating inductor 51 is energized by the high frequency power supply 50, and the capacitors 45 of the control circuit 40 are charged to a predetermined voltage. After preheating the second end portion 17 of the female driveshaft tube 11 to a predetermined temperature, the high frequency power supply 50 is switched off, and the female driveshaft tube 11 is instantly moved in an axial direction in the inductor coil 41 and is stopped at the moment the second end portion 17 of the female driveshaft tube 11 is correctly positioned. The inductor coil 41 is energized by means of discharging the capacitors 45 of the control circuit 40, which accomplishes the magnetic pulse cycle welding of the second end portion 17 of the female driveshaft tube 11 with the second yoke 18. It is also within the scope of the invention for the second yoke 18 to be attached to the second end portion 17 of the female driveshaft tube 11 in a separate step.

After that, the female driveshaft tube 11 together with the insert 20 and the mandrel 28 are axially moved left until the first end portion 14 of the female driveshaft tube 11 is properly located in the preheating inductor 51 to create the first and second annular array of magnetic pulse formed crimps 24, 25 on the first end portion 14 of the female driveshaft tube 11. The sequence of the heating and crimping operations is the same as is described above for welding, however, usually time or power of preheating is different and the energy of the magnetic pulse is lower. After creating one row of crimps all the assembly is retuned back into the preheating inductor 51 and stopped in the new axial position that is indexed the distance equal to the space between the first and second annular array of magnetic pulse formed crimps 24, 25 on the first end portion 14 of the female driveshaft tube 11.

Next, the sequence of the heating and crimping operations is repeated, but again, the parameters of heating and magnetic pulse could be corrected if necessary. A third and/or more rows of the crimps can be done the same way if necessary. Finally, the mandrel 28 is extracted from the insert 20 and the driveshaft assembly 10 is done.

From the foregoing description, one of ordinary skill in the art can easily ascertain the essential characteristics of this invention and, without departing from the spirit and scope thereof, can make various changes and modification to the invention to adapt it to various usage and conditions. For example, the described three state sequence of the magnetic pulse operation isn't optimal for high volume production of driveshafts. It is easy to see that those three stages can be made simultaneously if three pairs of preheating inductors and inductor coils are used. Naturally, the power supplies to energize the inductors have to be properly charged, which makes the production equipment significantly more expensive.

Figure 10:
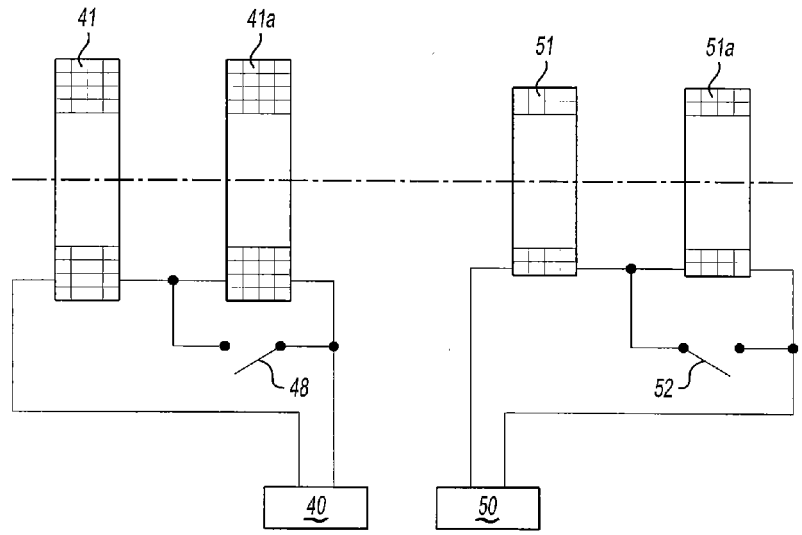
FIG. 10 is an illustration of a device and process in accordance with this invention.

As an intermediate, much cheaper choice, a two-stage magnetic pulse process can be used. For this it is necessary (see FIG. 10) to connect two pairs of preheating inductors 51 and inductor coils 41 in sequence, which can be closed or opened by switches 48, 52 depending on the type of operation performed—welding or forming. If a magnetic pulse welding operation is performed, the switches 48, 52 have to be closed. To perform the magnetic pulse crimp forming operation, switches 48, 52 have to be open. For one of ordinary skill in the art it's very easy to transform this layout using the parallel inductors connection.

Also, it's obvious that in the case of using any other method of welding instead of magnetic pulse welding to connect the second end portion 17 of the female driveshaft tube 11 with the second yoke 18, the preheating inductor 51 and the inductor coil 41 can be made long enough to provide just one row of relatively long crimps, if necessary. In some cases, for example, if the insert 20 is self-lubricated (made from the powder metal) this option could be practically justified.

Example

The second end portion 17 of the female driveshaft tube 11 with an outer diameter 114 mm, a wall thickness 2.5 mm and made from aluminum 6061T6 alloy was welded according with the present invention to the second yoke 18 made from aluminum 6061T6 alloy. The first end portion 14 of the female driveshaft tube 11 was connected with the Grob processed insert 20b (see FIG. 8) by means of two rows of magnetic pulse formed crimps 24, 25 axially spaced at 90 mm from each other. Both, the welding and crimping operations were performed in three stages exactly as described above and shown in FIG. 9 with the help of semiautomatic pneumatically actuated tooling and proper pulse power and induction heating equipment.

The one-turn pulse inductor coil 41 and the control circuit 40 (see FIG. 9) were made in accordance with U.S. Pat. No. 4,129,846. The capacitor 45 had a capacitance of 8.4 mF, maximal voltage U=5 kV and maximal energy of charging 105 kJ. The discharge circuit had a frequency of 10 kHz and amplitude current was I=1.12 MA in the process of magnetic pulse welding (U=2.8 kV) and I=1.0 MA in the process of the magnetic pulse crimp-forming (U=2.51 kV). The high frequency power supply 50 provided power of 25 kW and frequency about 20 kHz with water-cooled two-turn preheating inductor 51. Time of preheating was 6 seconds for welding and 8 seconds for crimping. A high quality female driveshaft tube 11 was gotten as a result of those operations. In particular, for that assembly a very good fit with the Grob-processed male tubular driveshaft member 12 and very low runout was gotten. The dimensions of all the crimp connections are very consistent.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A sliding splined slip joint for use in a vehicle driveshaft comprising:
    a tubular insert formed from a tubular body having inner and outer cylindrical surfaces, said tubular insert comprising axially-spaced circumferentially-aligned first and second annular arrays of axially-extending splines, said splines being radially-inwardly deformed from said inner cylindrical surface of said tubular body such to define corresponding recesses within said outer cylindrical surface of said tubular body, and such to define an annular pocket between said inner cylindrical surface of said tubular body and said first and second annular arrays of splines, said pocket extending radially-outward from and located between said first and second annular arrays of splines maintaining a substantially constant depth and width around an inner surface of said insert;
    a female tubular driveshaft member comprising at least one annular array of radially-inwardly extending magnetic pulse formed crimps, said crimps being complementary to and slidably engaged within corresponding said recesses defined by said first and second annular arrays of splines on said tubular insert, said tubular insert fixed within said female tubular driveshaft member by a magnetic pulse welding or magnetic forming process;
    a male driveshaft member having an annular array of radially-outwardly extending splines slidably engaged with said splines of said tubular insert, wherein said male driveshaft member is located within said tubular insert.

2. A sliding splined slip joint for use in a vehicle driveshaft according to claim 1, where said insert is formed from a metallic material or a metallic material alloy.

3. A sliding splined slip joint for use in a vehicle driveshaft according to claim 1, wherein said female driveshaft member comprises a first and a second annular array of magnetic pulse formed crimps, wherein said first and second annular arrays of crimps are axially spaced from one another.

4. A sliding splined slip joint for use in a vehicle driveshaft according to claim 1, wherein said splines of said insert are directly adjacent said magnetic pulse formed crimps of said female driveshaft member.

* * * * *